(12) United States Patent
Walker, III

(10) Patent No.: US 7,526,269 B1
(45) Date of Patent: Apr. 28, 2009

(54) REMOTE INTERCOM AND AUTOMATIC DIALING SYSTEM

(76) Inventor: Ethan A. Walker, III, 203 Red Oak La., Newalla, OK (US) 74857

( * ) Notice: Subject to any disclaimer, the term of this patent is extended or adjusted under 35 U.S.C. 154(b) by 623 days.

(21) Appl. No.: 11/404,817

(22) Filed: Apr. 14, 2006

(51) Int. Cl.
*H04Q 7/20* (2006.01)

(52) U.S. Cl. ............ 455/404.2; 455/426.1; 455/550.1; 455/564; 455/567; 340/539.13

(58) Field of Classification Search ... 455/404.1–404.2, 455/422.1–426.1, 456.1–456.2, 462, 465, 455/557, 556.1–556.2, 550.1, 564–565, 74.1, 455/567, 569.1; 340/870.07–870.09, 539.12–539.13, 340/426.18–426.19
See application file for complete search history.

(56) References Cited

U.S. PATENT DOCUMENTS

| 5,923,731 | A | 7/1999 | McClure |
| 6,032,036 | A | 2/2000 | Maystre et al. |
| 6,044,257 | A | 3/2000 | Boling et al. |
| 6,853,302 | B2 | 2/2005 | Monroe |
| 7,391,319 | B1* | 6/2008 | Walker ...................... 340/536 |
| 2002/0098874 | A1* | 7/2002 | Zirul et al. .................. 455/564 |
| 2005/0001717 | A1* | 1/2005 | Bohbot et al. ............... 340/531 |

* cited by examiner

*Primary Examiner*—Kamran Afshar
(74) *Attorney, Agent, or Firm*—James F. Harvey, III

(57) ABSTRACT

A system and method for providing a emergency notification capability is provided by providing a wireless pendant for each user of the system, which sends a signal to a central computer whenever an emergency condition is perceived. The central computer may then send a signal to a telephone dialing device assigned to the wireless pendant, causing the device to dial an emergency telephone number. Optionally, the central computer may select the telephone dialing device that is nearest in location to the user, by using standard techniques known to the art.

12 Claims, 2 Drawing Sheets

REMOTE INTERCOM AND AUTOMATIC DIALING SYSTEM

BACKGROUND OF THE INVENTION

The present invention generally relates to methods and devices for emergency signaling devices, and in particular to an emergency signaling device using a remote, centrally located computer system.

There are numerous devices on sale in today's marketplace for emergency notification and signaling of medical alarms and security alarms. Typically, they consist of a telephone dialing device that is attached to a telephone instrument, which is actuated by a wireless pendant within the proximity of the dialing device. There may be one or more wireless pendants that actuate the telephone dialing device. When one of the users presses a button on the wireless pendant, the pendant sends a wireless signal to the telephone dialing device to dial a preset telephone number, typically an emergency number such as that of an ambulance service. Some of these devices also offer the ability to open an intercom talk path between the user and the person receiving the call. After receiving the alarm, the person receiving the call can then have a two-way conversation with persons at the location of the dialer. An advantage for the user is that no manual action is necessary to maintain the two-way conversation. This feature is provided by the telephone dialing device in case the user is incapacitated in some way and unable to pick up a phone set. This hands-free, two-way communication is accomplished by means of a speaker and microphone in the telephone dialing device, which then transfers incoming and outgoing audio over existing telephone lines. Other systems may alternatively use the speaker as the microphone also and control the direction of the audio with a voice actuated switch (VOX) circuit.

However, in practice, there may be a number of disadvantages associated with this arrangement. First, the wireless pendant has a limited range and must be within range of the telephone dialing device in order to send its signal. Typically the wireless pendant will not have enough range to work beyond the user's apartment. Second, the use of phone lines or, the use of an intermediate facility phone switch can compromise the reporting of the alarms if any of the intermediate telephonic signal transfer equipment or infrastructure should fail.

In order to reduce reliance on the telephone system and intermediate equipment, a better method for reporting alarms throughout the facility is to install a series of wireless repeaters or wireless receivers, which do not depend on a phone system. Since such a system would not depend upon a telephone system, then the resulting system would be more reliable. Furthermore, the wireless pendants would be able to operate throughout the facility as opposed to being limited to operating in close proximity to the telephone dialing device. However, this improvement in alarm signaling eliminates the ability of having the intercom path to the person initiating the alarm because there is no longer a phone line to provide the talk path.

As can be seen, there is a need for a wireless emergency system that has decreased reliance on the telephone system for notification of an alarm and that is capable of choosing a telephone dialing device in close proximity to the user, which is selected from one or more possible telephone dialing devices.

SUMMARY OF THE INVENTION

A wireless remote intercom system is provided, where the system comprises a wireless pendant transmitting a first signal in response to manual action performed on the wireless pendant by a user; a central computer receiving the first signal, determining a telephone dialing device associated with the wireless pendant, and transmitting a second signal; and the selected telephone dialing device receiving the second signal, the telephone dialing device dialing in response to the second signal a telephone number of a remote party, the telephone dialing device further supporting two-way communications between the user and the remote party. Each wireless pendant may be assigned to only one telephone dialing device and each telephone dialing device may be assigned to one or more wireless pendants.

A method of notifying a service provider is also provided, where the method comprises the steps of (1) providing a user with a wireless pendant having a button that transmits a first signal when the button is pressed by the user; (2) pressing the button by the user to cause transmission of the first signal when an emergency condition is perceived by the user; (3) receiving the first signal by a central computer; (4) determining by the central computer a user location from the first signal; (5) selecting by the central computer a telephone dialing device from a plurality of telephone dialing devices, where the selected telephone dialing device has a device location that is closer to the user location than any other device location of any telephone dialing device in the plurality of telephone dialing devices; (6) sending a second signal to the selected telephone dialing device; (7) actuating the selected telephone dialing device to dial a telephone number stored in the telephone dialing device; (8) placing a telephone call by the selected telephone dialing device to a remote location; and (9) allowing the user and a party at the remote location to communicate with one another.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the current invention includes systems, devices, and methods for providing automatic, two-way voice dialers in various locations, which are activated by a software command from a central computer. A wireless command from the central computer is sent to the appropriate automatic dialer, causing it to go off-hook and to dial the preprogrammed telephone number. The person answering can then have a conversation with the person activating the alarm. The conversation for the activator is hands-free.

Figure 1:
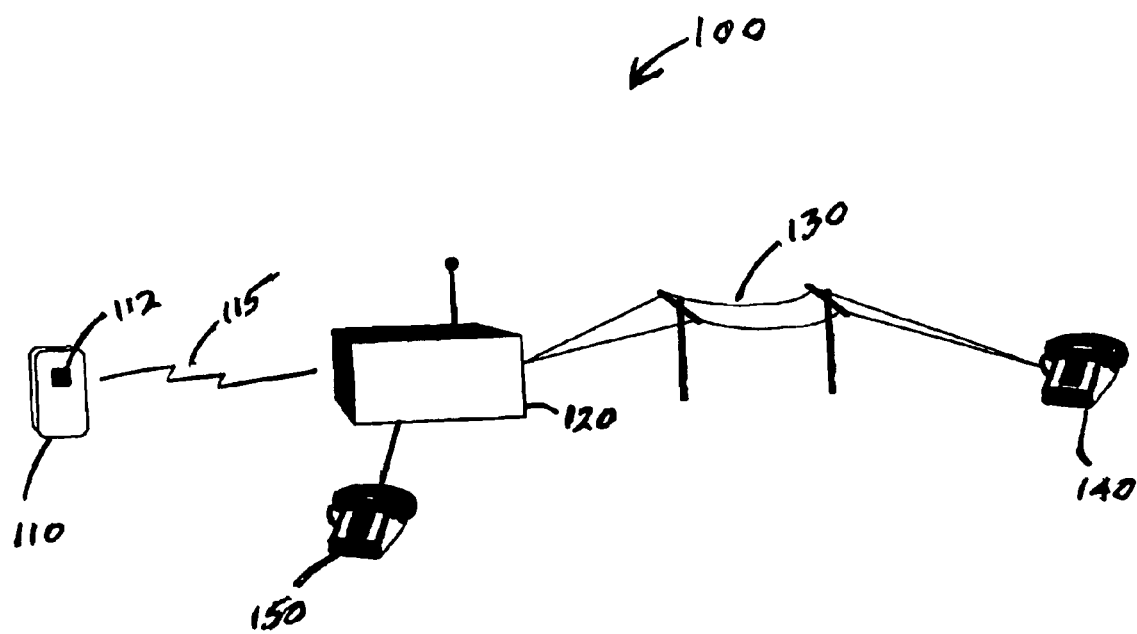
FIG. 1 shows a prior art system for sending a wireless alarm.

An example of the prior art is shown in FIG. 1. According to the system 100 shown in FIG. 1, a user carries a wireless pendant 110 having a button 112 for actuating the wireless pendant 110. A telephone dialing device 120 may be located in close proximity with the wireless pendant 110, with the telephone dialing device 120 programmed to dial a specific, pre-set telephone number when called upon to do so. The user carries the wireless pendant 110 around with him in case of an emergency. Normally, this is done in a health care context for such emergencies as falling and not being able to get up; heart attack; seizures; encounters with hostile individuals; and the like. When the user determines that he is in an emergency situation, he will press the button 112, which causes a signal 115 to be sent to the telephone dialing device 120. Upon receiving the signal 115, the telephone dialing device 120 will cause a telephone 150 to go off-hook and dial a programmed telephone number of a remote telephone 140. The remote telephone 140 may be located at an ambulance service or a monitoring service tasked to receive such emergency calls. A service provider will answer the remote telephone 140 and speak with the user at the local telephone 150. Optionally, the telephone dialing device 120 will feature an intercom so that the user can converse hands-free with the service provider.

The telephone dialing device 120 may be a unitary instrument or several different devices connected together. For example, the telephone dialing device 120 may comprise a "black box" serving as a controller for a telephone instrument and an intercom, sometimes called a "squawk box", with the devices connected together by power cords and four wire telephone cord. Alternatively, the telephone dialing device 120 may be a telephone instrument with a speaker and control circuitry integrated together within the telephone instrument. The invention does not depend upon the configuration of the telephone dialing device 120 so long as the necessary functionality is provided.

Such previous methods commonly rely on a direct path between the wireless pendant 110 and the telephone dialing device 120 assigned to it. The present invention provides a central computer to receive all signals 115 sent by all wireless pendants 110 in a facility and to process the activation of the appropriate telephone dialing device 120 assigned to the wireless pendant 110 generating the signal 115. This addition of a central computer into the process allows decisions to be made as to whether or not to activate the associated telephone dialing device depending on other circumstances, such as time of day or the nature of the alarm. In addition, variable criteria could be used to determine which telephone dialing device to activate, so that the wireless pendant 110 is not assigned to a single telephone dialing device. For example, if the user is roaming about the facility, the location of the user could be determined by conventional means well known in the art using the signal generated by the wireless pendant, and the nearest telephone dialing device 120 could be activated. This ability to activate intercom dialers according to changing locations of users activating alarms is not available with previous methods.

Figure 2:
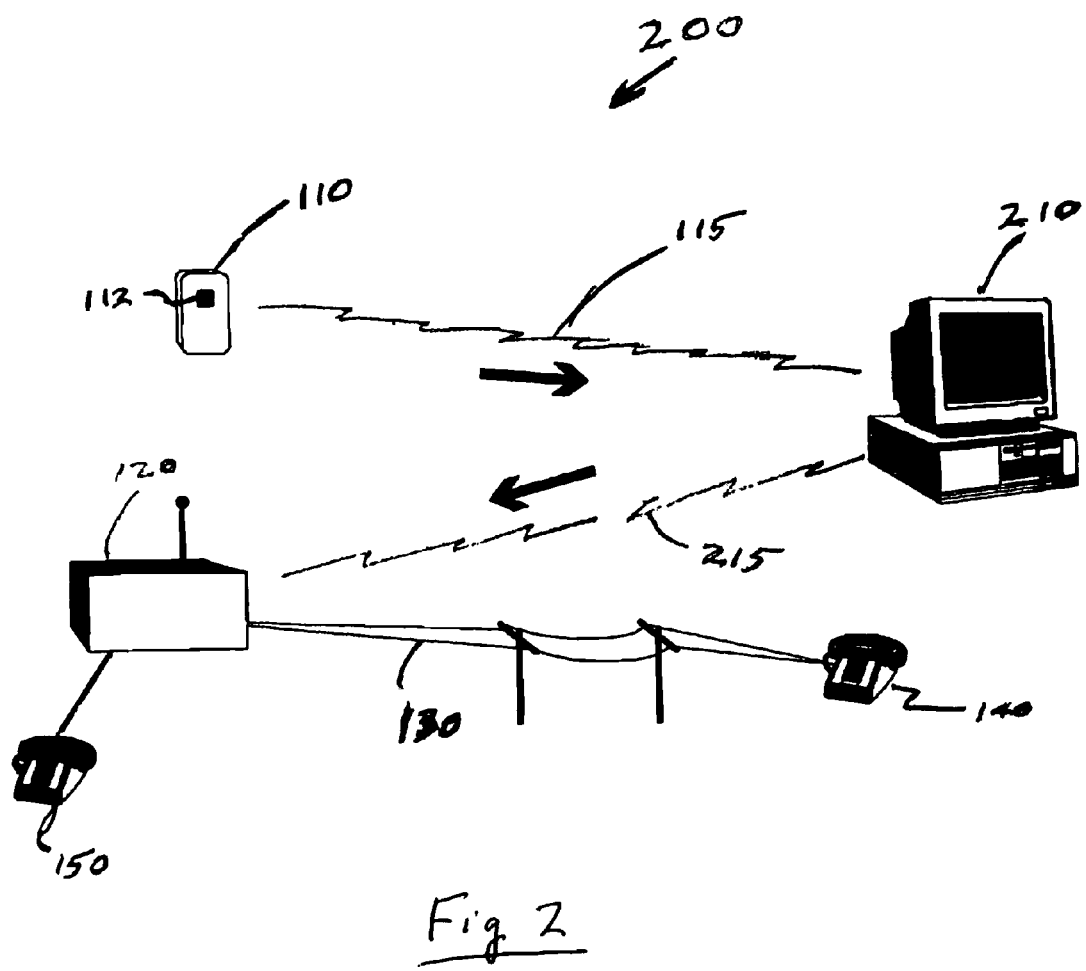
FIG. 2 shows wireless alarm system configured according to an embodiment of the invention.

Referring now to FIG. 2, a system 200 may be provided according to an embodiment of the invention, in which a user carries a wireless pendant 110 having a button 112 for actuating the wireless pendant 110 when the user determines that there is an emergency condition. When such a condition is perceived, the user may press the button 112, which causes a first signal 115 to be sent to a central computer system 210. The central computer system 210 may be equipped to receive signals generated by one or more wireless pendants 110, depending upon the method chosen for signaling. Typically, a radio frequency (RF) signal may be used for reasons of range and multiple access. Upon receiving the signal 115, the computer system 210 may contain logic in the form of software that will determine the location of the user from the signal using standard methods well known in the art. For example, a series of special receivers may be placed throughout the facility of interest, which will also detect the first signal and send a location identifier to the central computer 210 through a cabling system or a wireless RF repeater network. Other methods may be used without departing from the scope of the invention.

When the user location is determined, the logic in the computer system 210 may examine a list of known telephone dialing devices 120 within the facility, each telephone dialing device 120 having a known location, and compare the user location with each telephone dialing device location in order to determine the nearest telephone dialing device 120. When the nearest telephone dialing device 120 is selected, the central computer 210 may then send a second signal to the selected telephone dialing device 120 so that it may be activated.

The selected telephone dialing device 120 may then cause an associated telephone instrument 150 to go off hook and dial a pre-set telephone number, usually the telephone number of a remote telephone 140 of a service provider by means of the standard telephone system 130. The remote telephone 140 may be located at the desk of a staff person at the facility, an ambulance service, a monitoring service, or any responsible person tasked to receive such emergency calls. A responsible person may answer the remote telephone 140 and speak with the user at the local telephone 150. The telephone dialing device 120 may feature an intercom so that the user can converse hands-free with the service provider.

There are other scenarios in which this capability may prove to be useful. For example, a large university campus with many buildings could have software controlled intercom dialers positioned strategically throughout the many buildings and by wireless signal cause them to activate when alarms are received. The activated intercom dialer would then call security personnel, thus allowing them to listen in to the location in order to gain further information as to the status of the alarm event. The intercom dialers would be equipped with the ability to use "line seizure." This is essentially a relay which would disconnect all other phone instruments from a phone line allowing the dialer to have exclusive use of the "seized" phone line. When the need for the intercom feature is ended, the relay would revert to its normal state causing the intercom dialer to release the phone line for normal use. This method of line seizure is common to burglar and fire alarm systems. However, the use of line seizure in the intercom dialer would be optional depending the application and the need.

The invention is not dependent upon the wireless methodology used to activate the telephone dialing device 120. For example, a wireless repeater network that relays wireless commands from one repeater to the next may be used. A second method may use an onsite paging transmitter. Special paging receivers may be installed in each telephone dialing device 120 that provides a contact closure upon receipt of a specific and targeted paging system message. A third method may provide wireless receivers that may be hardwired back to the central computer 210 or that may be hardwired to multiple collectors that, in turn, communicate with the central computer 210 by wireless means. Any RF signal can be used to activate these telephone dialing devices 120.

As an option to pre-programming the telephone number in the telephone dialing device to a fixed telephone number, the central computer may send by RF transmission a message containing a telephone number to the telephone dialing device, whereupon the telephone dialing device would change its previous pre-programmed telephone number to that of the message. This would permit telephone calls could be placed to various responsible parties depending upon factors such as time or day or nature of the alarm.

Optionally, the termination of a telephone call activated by the second signal could be accomplished by a third signal issued by the software in the central computer 210, by a timer, by an external event (e.g. reset button, door closure, etc.), or by an internal timer within the telephone dialing device 120. Additional slave units could be incorporated in any given installation. Slave units would be incorporated when a single telephone dialing device 120 does not have the sonic sensitivity to cover a sufficiently large area. Additional slave units would allow for broader coverage of a selected area.

When the central computer 210 issues the second signal as a command to the selected telephone dialing device 120, then selected telephone dialing device 120 may go off-hook in response and, using standard DTMF tones, cause the preprogrammed number to be sent. The slave units may be connected to the same phone line so that they can receive the DTMF tones also without going off-hook. When the slave unit(s) receive and decode the DTMF sequence from the selected telephone dialing device 120, the slave unit(s) would know to go off-hook after a preprogrammed amount of time (typically 5 seconds). Now multiple units are providing hands-free audio in a more expanded area. The master and slave units would behave like multiple phone instruments or extensions off-hook at the same time on the same phone line. This is the same as several people talking at once on multiple phones on a single phone line.

As an alternative to activating the slave dialers by listening for the proper DTMF sequence, they may be activated by the same RF signal as that addressed to the selected telephone dialing device 120. Again, a delay may be incorporated before the slave units go off-hook so that the selected telephone dialing device 120 will have time to dial and connect. The selected telephone dialing device 120 would not be able to do this if any other slave unit was off-hook while the selected telephone dialing device 120 was attempting to dial.

As can be seen, the invention provides a remote dialing and intercom capability that does not depend upon the phone system for alarm activation. The invention allows alarm signaling that is not dependent upon a telephone system without sacrificing automatic two-way, hands free voice communication on the part of the user. It should be understood, of course, that the foregoing relates to exemplary embodiments of the invention and that modifications may be made without departing from the spirit and scope of the invention as set forth in the following claims.

I claim:

1. A wireless remote intercom system for a facility, the system comprising
    a wireless pendant transmitting a first signal in response to manual action performed on the wireless pendant by a user;
    a telephone dialing device having a device location;
    a central computer containing a list of all telephone dialing devices within the facility, the central computer disposed to receive the first signal, select a telephone dialing device from the list, and transmit a second signal to the selected telephone dialing device; the selected telephone dialing device receiving the second signal and responsively dialing a telephone number of a remote party, the telephone dialing device further supporting two-way communications between the user and the remote party.

2. The system described in claim 1, wherein each telephone dialing device comprises a telephone instrument.

3. The system described in claim 1, wherein each telephone dialing device comprises an intercom enabling the user to converse with the remote party without manual interaction with the telephone dialing device.

4. The system described in claim 1, wherein the telephone number is pre-programmed in the telephone dialing device.

5. The system described in claim 1, wherein the second signal contains a telephone number that replaces the pre-programmed telephone number in the telephone dialing device.

6. The system described in claim 1, wherein the list contains a device location associated with the telephone dialing device.

7. The system described in claim 1, wherein the central computer determines a user location of the user, examines each device location in the list, compares the user location with each device location, and selects the telephone dialing device having the device location that is nearest to the user location.

8. The system described in claim 1, further comprising a slave unit connected to the telephone dialing device.

9. A method of notifying a responsible person of an alarm condition, the method comprising the steps of
    providing a user with a wireless pendant having a button that transmits a first signal when the button is pressed by the user;
    pressing the button by the user to cause transmission of the first signal when an emergency condition is perceived by the user;
    receiving the first signal by a central computer;
    determining by the central computer a user location from the first signal;
    selecting by the central computer a telephone dialing device from a plurality of telephone dialing devices, wherein the selected telephone dialing device has a device location that is closer to the user location than any other device location of any telephone dialing device in the plurality of telephone dialing devices;
    sending a second signal to the selected telephone dialing device;
    actuating the selected telephone dialing device to dial a telephone number stored in the telephone dialing device;
    placing a telephone call by the selected telephone dialing device to a remote location; and
    allowing the user and a party at the remote location to communicate with one another.

10. The method described in claim 9, further comprising the steps of inserting by the central computer a second telephone number into the second signal; and
    replacing by the telephone dialing device the telephone number stored in the telephone dialing device with the second telephone number contained in the second signal.

11. The method described in claim 9, wherein the step of allowing the user and a party at the remote location to communicate with one another is accomplished by means of a telephone handset.

12. The method described in claim 9, wherein the step of allowing the user and a party at the remote location to communicate with one another is accomplished by means of an intercom.

* * * * *